United States Patent [19]
Best et al.

[11] Patent Number: 5,376,708
[45] Date of Patent: Dec. 27, 1994

[54] BIODEGRADABLE PLASTIC MATERIALS, METHOD OF PRODUCING THEM, AND THEIR USE

[75] Inventors: Bernd Best, Moerfelden; Klaus Wollmann, Eschhofen; Alexander Ach, Frankfurt am Main, all of Germany

[73] Assignee: Battelle Institute e.V., Frankfurt am Main, Germany

[21] Appl. No.: 906,878

[22] Filed: Jul. 2, 1992

Related U.S. Application Data

[63] Continuation-in-part of Ser. No. 862,492, Apr. 4, 1992, abandoned, which is a continuation of Ser. No. 583,380, Sep. 17, 1990, abandoned.

[30] Foreign Application Priority Data

Apr. 14, 1990 [EP] European Pat. Off. ........ 90107209.0

[51] Int. Cl.$^5$ ........................ C08L 1/10; C08L 1/20; C08L 1/14; C08K 5/00
[52] U.S. Cl. ........................ 524/37; 524/38; 524/39; 524/176; 524/174; 362/161; 431/289; 431/350
[58] Field of Search ........................ 524/37, 38, 39, 176, 524/174; 362/161; 431/289, 350

[56] References Cited

U.S. PATENT DOCUMENTS 2,423,823  7/1947  Baker .
3,992,337  11/1976  Kraft et al. .
4,729,793  3/1988  Eckenboff et al. .
4,731,122  3/1988  Cortese et al. .

FOREIGN PATENT DOCUMENTS 2128007  6/1971  Germany .

OTHER PUBLICATIONS

Modern Plastics Encyclopedia '92, Mid–Oct. 1991 Issue, vol. 68, No. 11, pp. 382, 383, and 392.
Kirk–Othmer Encyclopedia of Chemical Technology, Third Edition, vol. 16, p. 472 (1981).
Chemical Abstracts, Band 85, vol. 18, 1976, p. 425, Potts et al., (85: 1030108g).

*Primary Examiner*—Nathan M. Nutter
*Attorney, Agent, or Firm*—Spencer, Frank & Schneider

[57] ABSTRACT

A biodegradable plastic material based on cellulose esters and possibly biodegradable carboxylic acid esters, glycol esters or glycol ethers as softener, composed of from about 50 to about 90 weight percent cellulose ester, from about 5 to about 40 weight percent softener, from about 5 to about 30 weight percent polyester and from about 0.5 to about 5 weight percent AQ-nylon. The biodegradable plastic material may also contain organic acids and/or acid esters and/or ethers different from the softener, and other additives, such as flame inhibitors, and is distinguished by excellent biodegradability, injection molding and blow molding characteristics. Also disclosed are articles made of the material of the invention and methods of making such articles. It is preferably molded into thin sheets and transparent plastic articles, preferably into enclosures/containers for oil lamps, eternal flame oil candles, composition lights, other cemetery light designs, votive lights and thin sheets.

33 Claims, 2 Drawing Sheets

BIODEGRADABLE PLASTIC MATERIALS, METHOD OF PRODUCING THEM, AND THEIR USE

CROSS REFERENCE TO RELATED APPLICATIONS

This application is a continuation-in-part of U.S. application Ser. No. 07/862,492, filed Apr. 4, 1992, and now abandoned which is a continuation of U.S. application Ser. No. 07/583,380, filed Sep. 17, 1990, now abandoned. The present application also relates to EPO Application No. 90107209.0, filed Apr. 14, 1990, and Application No. P 39 14 022.9-01, filed in the Patent Office of the Federal Republic of Germany on Apr. 28, 1989, the entire specifications of which are incorporated herein be reference.

FIELD OF THE INVENTION

The present invention relates to novel plastic materials which are easily biodegraded by composing and to their use for the production of enclosures/containers for oil lamps, eternal flame oil candles, composition oil lamps, other cemetery light designs, votive lights and thin sheets.

In today's throw-away economy, the disposal of waste causes considerable problems.

BACKGROUND OF THE INVENTION

The disposal of plastic wastes is connected with great difficulties because, on the one hand, their combustion, due to the relatively high halogen content of the customarily employed plastics, produces aggressive combustion products which lead to great damage to the environment and, on the other hand, when stored in waste dumps, they either do not decompose at all or toxic byproducts are formed.

In view of these difficulties, it has been desired for some time to develop biodegradable plastic materials which are easily decomposed in waste dumps and do not produce environmentally damaging fission products so that their disposal does not pose difficulties while, on the other hand, their technical characteristics are such that they fully meet all expected requirements placed on them with respect to their being processed into plastic articles and with a view toward the characteristics of the plastic articles.

Cellulose esters, such as, for example, cellulose acetate and cellulose acetobutyrate, due to their low cost, have caught the attention of plastic processors for some time. Cellulose acetobutyrate includes approximately 20% acetate groups and 40% butyrate groups.

U.S. Pat. Nos. 4,729,793 and 4,731,122, for example, disclose transparent plastic objects made of cellulose acetate and cellulose acetobutyrate which contain, in addition to polyethylene glycol as softener, tributyl citrate and triethyl citrate. The cited patents do not disclose anything regarding biodegradability of these plastic objects.

Based on this state of the art, it is now the object of the present invention to create novel biodegradable and moldable plastic materials based on cellulose esters and carboxylic acid esters which are transparent or at least translucent and exhibit, on the one hand, the characteristics required for the manufacture of plastic objects by conventional means such as injection molding, blow molding, etc., which when shaped into such objects, have a sufficiently long service life and, on the other hand, are biodegradable after use in a sufficiently short period of time without creating damaging or harmful degradation reaction products.

SUMMARY OF THE INVENTION

The present invention provides a plastic material based on at least one cellulose ester, which may also include a biodegradable carboxylic acid ester, glycol ester and/or glycol ether as softener, a polyester and water soluble AQ-nylon characterized in that the material is composed of from about 50 to about 90 weight percent cellulose ester, from about 5 to about 40 weight percent of the softener, from about 5 to about 30 weight percent of at least one aliphatic linear polyester and from about 0.5 to about 5 weight percent water soluble AQ-nylon, each as compared to the total weight of the composition. The material of the invention may also contain organic acids and/or organic acid esters different from the softener. Preferably, the plastic material of the invention includes from about 60 to about 85 weight percent cellulose ester, from about 5 to about 20 weight percent carboxylic acid ester, glycol ester and/or glycol ether as softener, from about 10 to about 20 weight percent aliphatic linear polyester and from about 1 to about 2 weight percent water soluble AQ-nylon, each as compared to the total weight of the composition.

The invention also provides for a biodegradable plastic article made from the plastic material of the invention as well as methods for making such articles.

BRIEF DESCRIPTION OF THE DRAWING

FIG. 1 also shows the decomposition of sodium benzoate (indicated by -x-x), which is used as a control for the test.

DETAILED DESCRIPTION OF THE INVENTION

Figure 1:
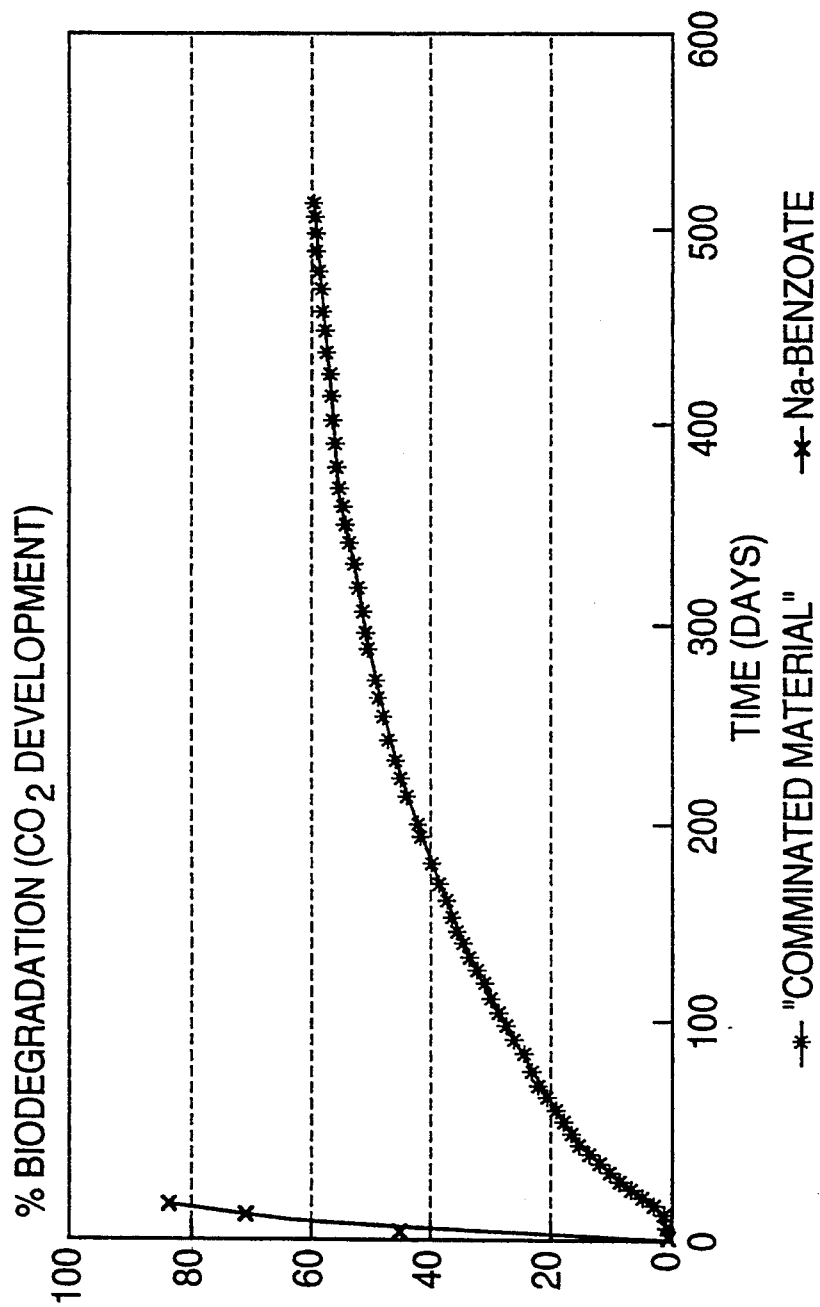
FIG. 1 illustrates the biodegradability of the plastic material of the invention under aerobic conditions in an aqueous medium (a "storm test").

The present invention provides a plastic material comprising from about 50 to about 90 weight percent of a cellulose ester, from about 5 to about 40 weight percent of a carboxylic acid ester, glycol ester or glycol ether as softener, from about 5 to about 30 weight percent aliphatic linear polyester, and from about 0.5 to about 5 weight percent water soluble AQ-nylon, each as compared to the total weight of the material. The material of the invention may also contain organic acids and/or organic acid esters different from the softener. Preferably, the plastic material of the invention includes from about 60 to about 80 weight percent cellulose ester, from about 25 to about 35 weight percent carboxylic acid ester, glycol ester and/or glycol ether as softener, from about 5 to about 15 weight percent aliphatic linear polyester and from about 1 to about 2 weight percent water soluble AQ-nylon.

The invention also provides for a biodegradable plastic article made from the plastic material of the invention as well as methods for making such articles.

The cellulose ester of the material of the invention is preferably cellulose acetate and/or cellulose acetobutyrate, most preferably cellulose acetate (secondary type) with an acetyl content between about 52 and about 56 percent. The softener is preferably at least one carboxylic acid ester having several ester and/or hydroxyl groups, such as citric acid ester, tartaric acid ester or succinic acid ester. Glycol ethers may also be used as softeners. Preferred in the material of the invention are citric acid esters. Most preferred is the glycol ester triacetin (glycerol triacetate).

In a plastic material having the desired characteristics, the polyester component is advisably a linear, hydroxyl group containing polyester having a molecular weight of from about 500 to about 3000 g/mol.

The organic acids and/or acid esters other than the softeners which may be part of the material of the invention are preferably lauric acid, maleic acid, itaconic acid, polytactic acid or their carboxylic acid esters. Particularly preferred is itaconic acid dimethyl ester. These compounds may be added to the plastic material in a quantity up to about 30 weight percent, preferably up to about 15 weight percent, both as compared to the total weight of the remaining components.

The citric acid ester softener contained in the plastic material according to the invention is advisably acetyl triethyl citrate which, on the one hand, is inexpensive and, on the other hand, poses no health or safety problems with respect to biodegradability. Additionally, glycol esters and glycol ethers are suitable for use as softener in the material of the invention. Triacetin (glycerol triacetate) is also a preferable softener.

Water-soluble nylon polymer (AQ-nylon), is of the formula:

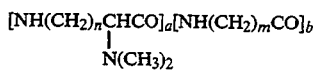

$$[NH(CH_2)_nCHCO]_a[NH(CH_2)_mCO]_b$$
$$|$$
$$N(CH_3)_2$$

where a and b are from about 2.3 to about 2.7 (that is, the degree of polymerization is between about 2.3 and about 2.7), and m and n are independently integers less than or equal to about 12, and may be 1, 2, 3, 4, 5, 6, 7, 8, 9, 10, 11 or 12. (AQ-nylon is described in Miyama, H., Kawata, M., and Nosaka, Y., "Immobilization of enzyme on dimethyl-aminated nylon gels", *Biotechnology and Bioengineering*, v. 27 n. (1985) pp. 1403–1410; Miyama, H., Kobayashi, T., and Nosaka, Y., "Immobilization of enzyme on nylon containing pendant quaternized amine groups", *Biotechnology and Bioengineering*, v. 26 n. 11 (1984) pp. 1390–1392; and Miyama, H., Kobayashi, T., and Nosaka, Y., "Immobilization of urease on synthetic polymers", *Biotechnology and Bioengineering*, v. 24 n. 12 (1982) 2757–2763, each of which are incorporated herein by reference.) This AQ-nylon is desirably included in the material of the invention as a processing aid for use in extrusion and calendering. In addition to aiding in processing, water soluble AQ-nylon also has the beneficial effects of reducing the development of smoke due to acetic acid vapors and, since it is a hygroscopic material and therefore binds residual moisture during processing, helps prevent hydrolytic fission reactions of the other components in the material of the invention.

The above-described plastic material may be molded without difficulty into the corresponding plastic articles in the conventional manner and processes, for example, by injection molding, extrusion or blow molding.

In addition to the components of the material recited above, conventional flame inhibitors can be added for producing a flame-resistant material. Such flame inhibiting substances may be added to the plastic material according to the invention in a quantity of up to about 20% with respect to the total weight of the remaining components. It has been found to be particularly advantageous for the flame inhibitor to be an organophosphorus compound, since this does not interfere with the desired of the material of the invention with respect to biodegradability. Hydroxyethane phosphonic acid dimethyl ester and triphenyl phosphate are preferred as the organophosphorous flame inhibitor.

Surprisingly, biodegrading tests have shown that the rate of decomposition of the plastic material and articles made thereof can be accelerated considerably by the addition of iron and/or manganese compounds. Preferably, these iron and/or manganese compounds are added in a quantity up to about 10 weight percent, most preferably up to about 5 weight percent, both as compared to the total weight of the remaining components. The iron or manganese compounds decomposition accelerators may be either inorganic or organic compounds. Bivalent iron compounds, particularly organic iron compounds are preferred as the decomposition accelerators in the plastic material of the invention. When desired, such organic iron compounds to be added are, for example, iron acetate or ferrocene, that is, derivatives of bis-(cyclopentadienyl) iron or iron (II) acetylacetonate.

The plastic material according to the invention is particularly suitable for the production of plastic sheeting from which articles such as shopping bags are produced in the conventional way. Such plastic products, which are manufactured in immense numbers, can be disposed of after use in an environmentally undamaging manner by simple composting. On the other hand, the strength characteristics of the thin sheets produced from the plastic material according to the invention are sufficient and meet all requirements placed on them for use, for example, as the shopping bags describe above.

Another particularly advantageous use for the biodegradable plastic materials according to the invention is in the manufacture of enclosures or containers for oil lamps, eternal flame oil candles, composition oil lights, other cemetery light designs and votive lights, which are filled with an appropriate combustible material, e.g. as specified by RAL, are placed onto graves and usually land on the garbage pile when the fuel has been consumed. The disposal of such enclosures or containers is extremely problematic for those enclosures or containers known prior to those of the invention, since the previous containers are made primarily of polyvinylcarbonate (PVC) which generally does not decompose and, if combusted, produces extremely environmentally damaging reaction products.

In contrast the previous PVC articles, the enclosures or containers for oil lamps, eternal flame oil candles, composition oil lamps, other cemetery light designs, votive lights and thin sheets manufactured from the plastic materials according to the invention do not pose any environmental problems whatsoever and can be disposed of simply by composting.

The manufacture of the plastic materials according to the invention advisably is effected in such a manner that the liquid components, such as the softener (e.g. citric acid ester) and the polyester are mixed together and then added to the solid, powdered cellulose ester and granulated water soluble AQ-nylon in a high speed mixer. The preparation thus obtained is then granulated at from about 160° C. to 200° C., is pelletized if desired, and can be molded in this form in an injection molding or blow molding process into the manufactured article of the invention. In the method of the invention, granulation is preferably effected with the aid of an extruder. Preferable for the extrusion is a double screw extruder. The extrudate is comminuted. It is particularly advantageous to extrude the mixture or, more precisely, feed it into the extruder directly following the mixing as described above, thereby essentially avoiding the absorption of moisture. Thus, it is preferred that no intermediate storage take place between mixing the components of the invention and extrusion. Storage and subsequent drying of the mixture have been found to be disadvantageous, particularly for blow molding.

The other additives, such as, for example, flame proofing agents and possibly the organic iron (II) compounds are also added in the high speed mixer.

The invention is described in greater detail with reference to the examples below.

EXAMPLE 1

An intimate mixture was produced by mixing together 10 parts by weight polyester, 10 parts by weight acetyl triethyl citrate, 10 parts by weight triphenyl phosphate and 70 parts by weight cellulose acetobutyrate in a turbulence mixer (type Papenmeier). This mixture was granulated at 170° C. and, likewise at this temperature, shaped into small cups in an injection molding machine of the Arburg Allrounder-221 type. The wall thickness was 1 mm.

The resulting molded article was transparent (its transparency compared to polyethylene terephthalate of quality g was about 80%). The molded article continued to be relatively soft, poorly flammable and resistant to hot oil (60° C.) as well as low temperature resistant to −20° C.

The biodegradability of the material according to the invention was examined qualitatively in a laboratory composting test. The time required until the material decomposed and no particles could be found lies between one year and five years. Resistance to biological attack exists for at least six months.

EXAMPLE 2

An intimate mixture was produced by mixing together 10 parts by weight polyester, 15 parts by weight acetyl triethyl citrate, 15 parts by weight hydroxyethane phosphonic acid dimethyl ester and 60 parts by weight cellulose acetate in a turbulence mixer (type Papenmeier). The mixture was granulated at 200° C. and the granulate was molded into small bottles in an extrusion blow molder (type Dekum BAE 1) at 180° C. (4.25 bar blowing pressure).

The bottles produced in this manner had a transparency similar to that of the cups obtained in Example 1. However, the material was stronger, its temperature stability even better and its flame resistance excellent. When exposed to a flame, the material melted and decomposed with only small amount of smoke development. All other thermal, mechanical and biological characteristics approximately corresponded to the product of Example 1. The bottles had a wall thickness of about 0.5 mm.

EXAMPLE 3

An intimate mixture was produced by mixing together 10 parts by weight polyester, 20 parts by weight acetyl triethyl citrate, 10 parts by weight itaconic acid dimethyl ester and 60 parts by weight cellulose acetate, and the resulting material was processed under pressure into a thin compressed sheet (5 tons on an area of 100 cm², temperature 200° C.). The resulting thin sheet was transparent, strong and stable and met the requirements placed on it.

EXAMPLE 4

An intimate mixture was produced by mixing together 10 parts by weight polyester, 13 parts by weight citric acid ester, 2 parts by weight iron (II) acetyl acetonate and 75 parts by weight cellulose acetate and was molded into a thin sheet as in Example 3. The thin sheet was transparent and slightly reddish-yellow. Otherwise, its characteristics corresponded to those of the thin sheet of Example 3.

EXAMPLE 5

Sixty parts by weight cellulose acetate, 30 parts by weight acetyl triethyl citrate and 10 parts by weight linear, aliphatic polyester were mixed in a high speed ball mixer and then extruded and granulated. As in Example 2, the material was processed in a blow molding machine. The resulting products were oil lamp containers having a use weight of 20 g. The enclosures exhibited excellent transparency and homogeneity. The enclosures were filled with a combustible substance and equipped with a wick and a holder. The material withstood the temperature of the molten combustible substance (about 60° C.). The candle burnt down properly, the shape of the enclosure remained entirely the same.

The products manufactured from the plastic materials according to the invention proved to be easily biodegradable so that their disposal caused no problems.

EXAMPLE 6

A mixture of 65 weight percent cellulose acetate, 25 weight percent triacetin and 10 weight percent aliphatic linear polyester is prepared in a high speed mixer and extruded and granulated according to the above examples. The mixture is extruded in an extruder 19/25 D which has a three-zone worm 3:1, with a temperature of 170° C. at the inlet and rises up to 180° C. at the nozzle. The material is then processed, at a controlled temperature of 75° C., into a flat sheet by way of a triple roller extraction system with a broadly slotted nozzle having dimensions of 75×0.5 mm. The resulting film is highly transparent and flexible. This film is then shaped into a blister shell in a laboratory deep drawing system.

EXAMPLE 7

A mixture of 65 weight percent cellulose acetate, 25 weight percent triacetin and 10 weight percent aliphatic linear polyester is prepared and extruded and granulated as in Example 6. Water soluble, granulated AQ-nylon is added to the mixture to 2 weight percent as compared to the total final weight of the composition. Thus, the final make-up of the composition is 63.7 weight percent cellulose acetate, 24.5 weight percent triacetin, 9.8 weight percent aliphatic linear polyester and 2 weight percent water soluble AQ-nylon. This granulate mixture is then extruded and processed into strands by way of a circular slot nozzle having a diameter of 2 mm. The extruder temperature is from 160° C. at the inlet to 170° C. at the nozzle. (The granulated water soluble AQ-nylon can also be initially combined with the other components thereby making the second extrusion unnecessary.) There is a minimal amount of smoke developed during the processing. Thermoplastic strands, which are glass clear and free of bubbles are obtained.

EXAMPLE 8

Description of the Biological Decomposition of the Material of the Invention.

Cemetery light covers were made of the plastic material of the invention by a blow molding process. The covers were then tested for biodegradability in both aerobic conditions in an aqueous medium (a "storm test") and in anaerobic conditions in clarification sludge. The storm test, which is known to those skilled in the art, corresponded to the OECD Guidelines (European Community Guidelines) and can be employed to prove the biodegradability of plastics.

A cemetery light was comminuted and the pieces were examined for decomposition in an aqueous medium containing samples of creek water, river water and water from purification plants. The degree of decomposition is determined by the amount of carbon dioxide released upon exposure to $CO_2$-free air. The decomposition was monitored until 60 percent of the material had degraded as determined by carbon dioxide release. Results of such a storm test are presented in FIG. 1 (indicated by -*-*-), from which it can be seen that the material of the invention is 60 percent degraded after about 500 days in aerobic, aqueous conditions. The data in FIG. 1 demonstrate that basic decomposition of the material of the invention occurred, since the polymer component was included in the decomposition process without transition. If decomposition had not occurred, the process would have stopped at about 40 percent, which corresponds to the percentage of low molecular weight components in the material. FIG. 1 also indicates the decomposition of sodium benzoate (indicated by -x-x-), which was used as a control for the test.

Figure 2:
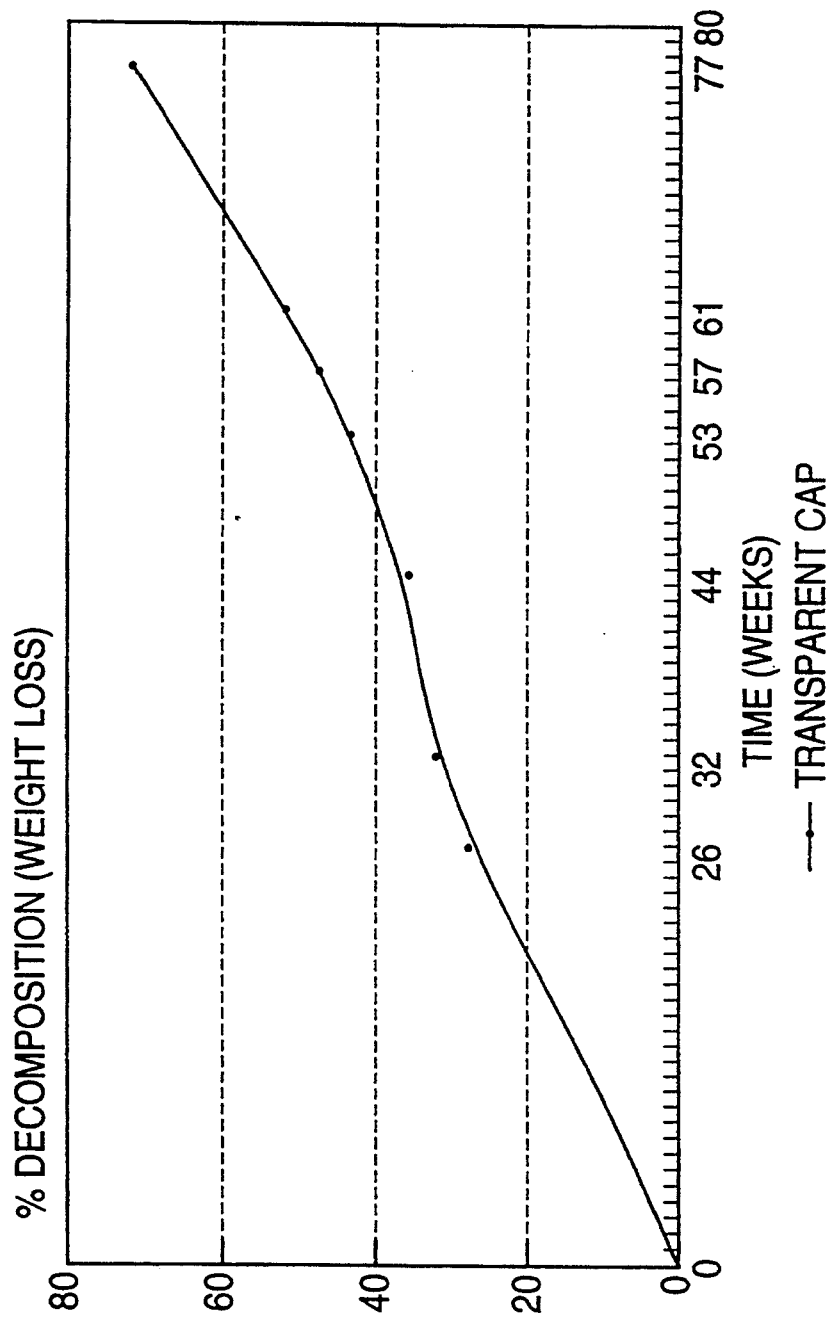
FIG. 2 illustrates the biodegradability of plastic material according to the invention in anaerobic conditions in clarification sludge.

The anaerobic decomposition of the material of the invention was determined by measuring the weight loss of a complete cemetery light cover in clarification sludge over time. FIG. 2 demonstrates the results of such an anaerobic degradation test. In this test, a degree of about 70 percent decomposition was obtained in about 7780 weeks.

It is understood that various other modifications will be apparent to and can be readily made by those skilled in the art without departing from the scope and spirit of this invention. Accordingly, it is not intended that the scope of the claims appended hereto be limited to the description set forth above but rather that the claims be construed as encompassing all of the features of patentable novelty which reside in the present invention, including all features which would be treated as equivalents thereof by those skilled in the art to which the invention pertains.

What is claimed is:

1. A biodegradable, moldable plastic material comprising from about 50 to about 90 weight percent of cellulose ester, from about 5 to about 40 weight percent of biodegradable carboxylic acid ester, glycol ester or glycol ether as softener, up to about 30 weight percent of an organic acid or organic acid ester different from said softener, from about 5 to 30 weight percent of polyester and from about 0.5 to about 5 weight percent AQ-nylon of the formula

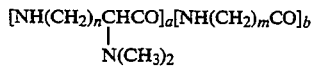

where a and b are from about 2.3 to about 2.7, and m and n are independently integers less than or equal to about 12.

2. The plastic material according to claim 1, wherein said organic acid or organic acid ester different from said softener is present in an amount from about 10 to about 30 weight percent.

3. The plastic material according to claim 2, wherein said organic acid or organic acid ester different from said softener is an organic acid ester.

4. The plastic material according to claim 3, wherein said organic acid ester different from said softener is itaconic acid dimethyl ester.

5. A plastic material according to claim 2, wherein said organic acid different from said softener is selected from the group consisting of lauric acid, maleic acid, itaconic acid, and polylactic acid.

6. The plastic material according to claim 3, where said organic acid ester different from said softener is selected from the group consisting of the esters of lauric acid, maleic acid, itaconic acid, and polylactic acid.

7. The plastic material according to claim 2, wherein said organic acid or organic acid ester different from said softener is in a quantity from about 5 up to about 15 weight percent with respect to the weight of the remaining components.

8. The plastic material according to claim 3, wherein said organic acid ester different from said softener is in a quantity from about 5 up to about 15 weight percent with respect to the weight of the remaining components.

9. The plastic material according to claim 1, comprising from about 60 to about 80 weight percent of said cellulose ester, from about 5 to about 20 weight percent of said softener, from about 10 to about 20 weight percent of said polyester and from about 1 to about 2 weight percent of said AQ-nylon.

10. The plastic material according to claim 1 wherein said cellulose ester is cellulose acetate or cellulose acetobutyrate.

11. The plastic material according to claim 1, wherein said softener is glycerol triacetate or a biodegradable carboxylic acid ester including a plurality of ester or hydroxyl groups.

12. The plastic material according to claim 11, wherein said softener is selected from the group consisting of citric acid ester, tartaric acid ester and succinic acid ester.

13. The plastic material according to claim 1, wherein said polyester is a linear, hydroxyl group containing aliphatic polyester having a molecular weight from 500 to 3000 g/mol.

14. The plastic material according to claim 12, wherein said citric acid ester is acetyl triethyl citrate.

15. The plastic material according to claim 1, further comprising a flame inhibiting additive in a quantity of up to about 20 weight percent with respect to the weight of the remaining components.

16. The plastic material according to claim 15, wherein said flame inhibiting additive is an organophosphorus compound.

17. The plastic material according to claim 16, wherein said flame inhibiting additive is hydroxyethane phosphoric acid dimethyl ester.

18. The plastic material according to claim 1, further comprising an effective amount of at least one decomposition accelerator selected from the group consisting of iron compounds, manganese compounds, and mixtures thereof.

19. The plastic material according to claim 18, wherein said decomposition accelerator comprises from about 2 to about 10 weight percent of at least one manganese compound.

20. The plastic material according to claim 18, wherein said decomposition accelerator comprises from about 2 to about 10 weight percent of at least one iron compound.

21. The plastic material according to claim 18, comprising from about 2 to about 5 weight percent of at least one decomposition accelerator selected from the group consisting of iron compounds, manganese compounds, and mixtures thereof.

22. The plastic material according to claim 21, wherein said decomposition accelerator comprises at least one organic iron (II) compound.

23. A method of producing a biodegradable, moldable plastic material comprising from about 50 to about 90 weight percent of cellulose ester, from about 5 to about 40 weight percent of biodegradable carboxylic acid ester, glycol ester or glycol ether, from about 5 to about 30 weight percent of a polyester and from about 0.5 to about 5 weight percent AQ-nylon of the formula

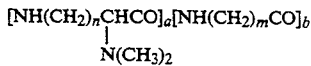

where a and b are from about 2.3 to about 2.7, and m and n are independently integers less than or equal to about 12, comprising the steps:
a) mixing 50 to 90 weight percent of cellulose ester, 5 to 40 weight percent of biodegradable carboxylic acid ester, glycol ester or glycol ether as softener, 5 to 30 weight percent of a polyester and from about 0.5 to about 5 weight percent AQ-nylon of formula

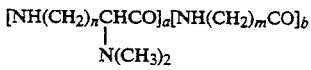

where a and b are from about 2.3 to about 2.7, and m and n are independently integers less than or equal to about 12; and
b) heating and extruding said mixture immediately after said mixing and essentially avoiding the absorption of moisture to produce a biodegradable, moldable plastic material.

24. The method according to claim 23, wherein said plastic material further comprises organic acid different from said softener, and wherein said mixing step further comprises mixing in organic acid different from said softener.

25. The method according to claim 23, wherein said plastic material further comprises organic acid ester different from said softener, and wherein said mixing step further comprises mixing in organic acid ester different from said softener.

26. The method according to claim 25, wherein said plastic material further comprises organic acid ester different from said softener, and wherein said mixing step further comprises mixing in organic acid ester different from said softener.

27. The method according to claim 23, wherein said heating and extruding step uses a double screw extruder.

28. The method according to claim 23, wherein said heating and extruding step takes place at from about 160° to about 200° C.

29. In a method of producing thin plastic sheets, the improvement comprising molding said thin plastic sheets using a biodegradable, moldable plastic material comprising from about 50 to about 90 weight percent of cellulose ester, from about 5 to about 40 weight percent of biodegradable carboxylic acid ester, glycol ester or glycol ether as softener, from about 5 to about 30 weight percent of polyester and from 0.5 to about 5 weight percent AQ-nylon of the formula

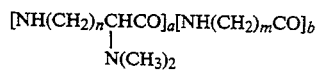

where a and b are from about 2.3 to about 2.7, and m and n are independently integers less than or equal to about 12.

30. In a method of producing articles by injection molding, extrusion or blow molding, the improvement comprising using a biodegradable, moldable plastic material comprising from about 50 to about 90 weight percent of cellulose ester, from about 5 to about 40 weight percent of biodegradable carboxylic acid ester, glycol ester or glycol ether as softener, from about 5 to about 30 weight percent of polyester and from about 0.5 to about 5 weight percent of AQ-nylon of the formula

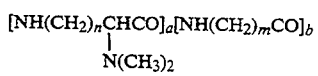

where a and b are from about 2.3 to about 2.7, and m and n are independently integers less than or equal to about 12.

31. In a method of producing containers for oil lamps, eternal flame oil candles, composition oil lamps and other cemetery light designs, and votive lights, the improvement comprising molding said containers using a biodegradable, moldable plastic material comprising from about 50 to about 90 weight percent of cellulose ester, from about 5 to about 40 weight percent of biodegradable carboxylic acid ester, glycol ester or glycol ether as softener, from about 5 to about 30 weight percent of polyester and from about 0.5 to about 5 weight percent of AQ-nylon of the formula

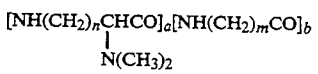

where a and b are from about 2.3 to about 2.7, an m and n are independently integers less than or equal to about 12.

32. Containers for oil lamps, eternal flame oil candles, composition oil lamps, other cemetery light designs, votive lights and thin plastic sheets comprising a plastic material according to claim 1.

33. Containers for oil lamps, eternal flame oil candles, composition oil lamps, other cemetery light designs, votive lights and thin plastic sheets recited in claim 32, that are manufactured by blow molding injection molding.

* * * * *